(12) United States Patent
Sainvil

(10) Patent No.: US 10,084,897 B2
(45) Date of Patent: Sep. 25, 2018

(54) ELECTRONIC DEVICE HOUSING WITH REMOVABLE CAMERA

(71) Applicant: Johnson Sainvil, Ellenwood, GA (US)

(72) Inventor: Johnson Sainvil, Ellenwood, GA (US)

(*) Notice: Subject to any disclaimer, the term of this patent is extended or adjusted under 35 U.S.C. 154(b) by 0 days.

(21) Appl. No.: 15/704,732

(22) Filed: Sep. 14, 2017

(65) Prior Publication Data

US 2018/0077272 A1    Mar. 15, 2018

Related U.S. Application Data

(60) Provisional application No. 62/395,030, filed on Sep. 15, 2016.

(51) Int. Cl.
| | |
|---|---|
| *H04M 1/00* | (2006.01) |
| *H04M 1/02* | (2006.01) |
| *H04N 5/225* | (2006.01) |
| *H04B 1/3888* | (2015.01) |
| *H04B 1/38* | (2015.01) |

(52) U.S. Cl.
CPC ........ *H04M 1/0264* (2013.01); *H04B 1/3888* (2013.01); *H04M 1/0256* (2013.01); *H04N 5/2252* (2013.01); *H04N 5/2253* (2013.01); *H04N 5/2254* (2013.01); *H04N 5/2256* (2013.01); *H04N 5/2257* (2013.01); *H04B 1/38* (2013.01)

(58) Field of Classification Search
CPC ........................................................ H04M 1/03
USPC ........................................................ 455/575.1
See application file for complete search history.

(56) References Cited

U.S. PATENT DOCUMENTS

| | | | |
|---|---|---|---|
| 7,957,765 B1* | 6/2011 | Causey | H04M 1/0256 455/550.1 |
| 2004/0005915 A1* | 1/2004 | Hunter | G08B 13/19621 455/575.1 |
| 2009/0042606 A1* | 2/2009 | Embler | H04M 1/22 455/556.1 |
| 2014/0092299 A1* | 4/2014 | Phillips | H04N 5/2252 348/376 |
| 2017/0208226 A1* | 7/2017 | Zhang | H04N 5/2252 |

* cited by examiner

*Primary Examiner* — Wen Huang

(57) ABSTRACT

An apparatus used with an electronic device consists of an electronic device housing and a camera. The camera is removably attached to the electronic device housing via an attachment mechanism. The camera is used to gather visual data for a photograph or a video. The camera is controlled wirelessly through an electronic device mounted onto the electronic device housing. The visual data is wirelessly transferred from the camera to the electronic device housing and eventually to the electronic device. The photograph or video is developed through the electronic device. A wireless transceiver of the camera and a wireless communication module of the electronic device housing is used for wireless interactions.

9 Claims, 11 Drawing Sheets

ELECTRONIC DEVICE HOUSING WITH REMOVABLE CAMERA

The current application claims a priority to the U.S. Provisional Patent application Ser. No. 62/395,030 filed on Sep. 15, 2016.

FIELD OF THE INVENTION

The present invention relates generally to surveillance devices. More specifically, the present invention is an electronic device housing with a removable camera. The present invention can be used solely as a mobile device or as a casing for a different electronic device.

BACKGROUND OF THE INVENTION

Smart device cameras, specifically smart phone cameras, are a common tool for capturing everyday images and videos. Typical smart phone cameras offer a variety of features that may alter and adjust the images and videos captured. The main limitation of smart phone cameras is the distance a user may be from his or her phone while using the camera of the smart phone. Timers and selfie sticks are common solutions to this issue, however both present difficulties as well. Timers rush the picture or video taking process and typically result in an incomplete or less than perfect picture or video. Selfie sticks are still limited in the distance between the user and the camera lens. Selfie sticks also tend to be seen in the image or video captured by the camera as well.

Remote shutter release devices address the issue of not having control over a camera that is set up at a distance. However, the need to carry a remote shutter release and a compatible camera can be stressful and impractical. Thus, the need for a method that utilizes an everyday electronic device to take pictures without any limitations is evident.

The objective of the present invention is to address the aforementioned issues. In particular, the present invention introduces an electronic device housing with a removable camera. By utilizing the present invention, the need to have a remote shutter release or comparable method is eliminated. The present invention wirelessly communicates with the smart, phone while removed from the smart phone such that any captured images or videos is saved to the corresponding smart phone. The typical features of the camera application of the smart phone are still applicable to the camera lens of the present invention.

DETAIL DESCRIPTIONS OF THE INVENTION

All illustrations of the drawings are for the purpose of describing selected versions of the present invention and are not intended to limit the scope of the present invention.

The present invention introduces a device with a removable camera. More specifically, the present invention introduces an electronic device housing with a removable camera. By utilizing the present invention, capturing self-portraits from a distance and taking a photograph of a large group can be executed without the use of any external devices.

As illustrated in FIGS. 1-5, the present invention comprises a camera 1 and an electronic device housing 6. The camera 1 is used for capturing photographs or recording video. The electronic device housing 6 is used as the intermediate platform to the electronic device that is used to control the camera 1. In particular, the electronic device housing 6 is attached to the electronic device that is being used to control the functionalities of the camera 1. The electronic device can be, but is not limited to, a mobile phone or a portable computing device. To allow the present invention to be used with a variety of electronic devices, the shape and size of the electronic device housing 6 can vary from one embodiment to another. The electronic device housing 6 can also be a device cover in one embodiment of the present invention. To allow the user to utilize the camera 1 remotely, the camera 1 is removably attached to the electronic device housing 6.

Figure 1:
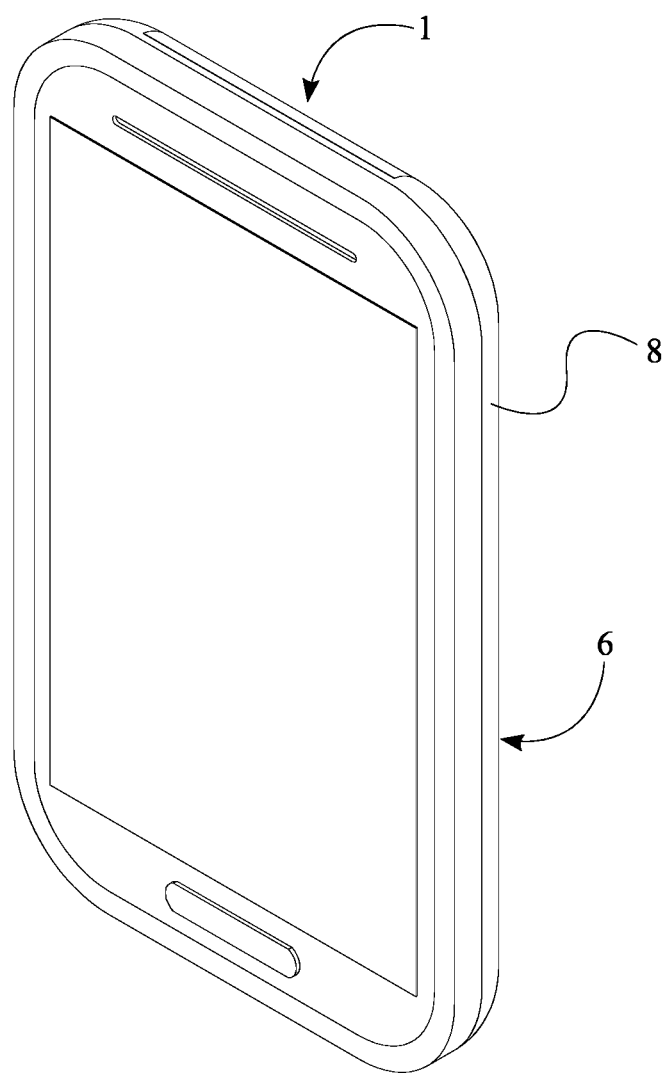
FIG. 1 is a perspective view of the present invention being used on an electronic device.
Figure 2:
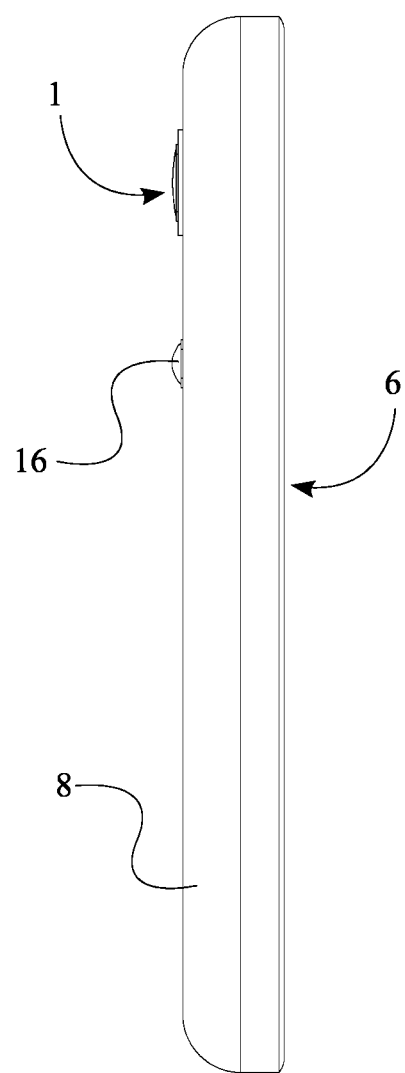
FIG. 2 is a side view of the present invention.
Figure 3:
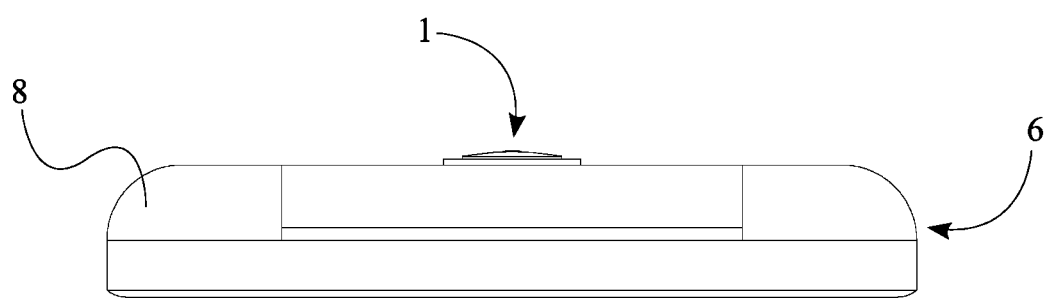
FIG. 3 is a top view of the present invention.
Figure 4:
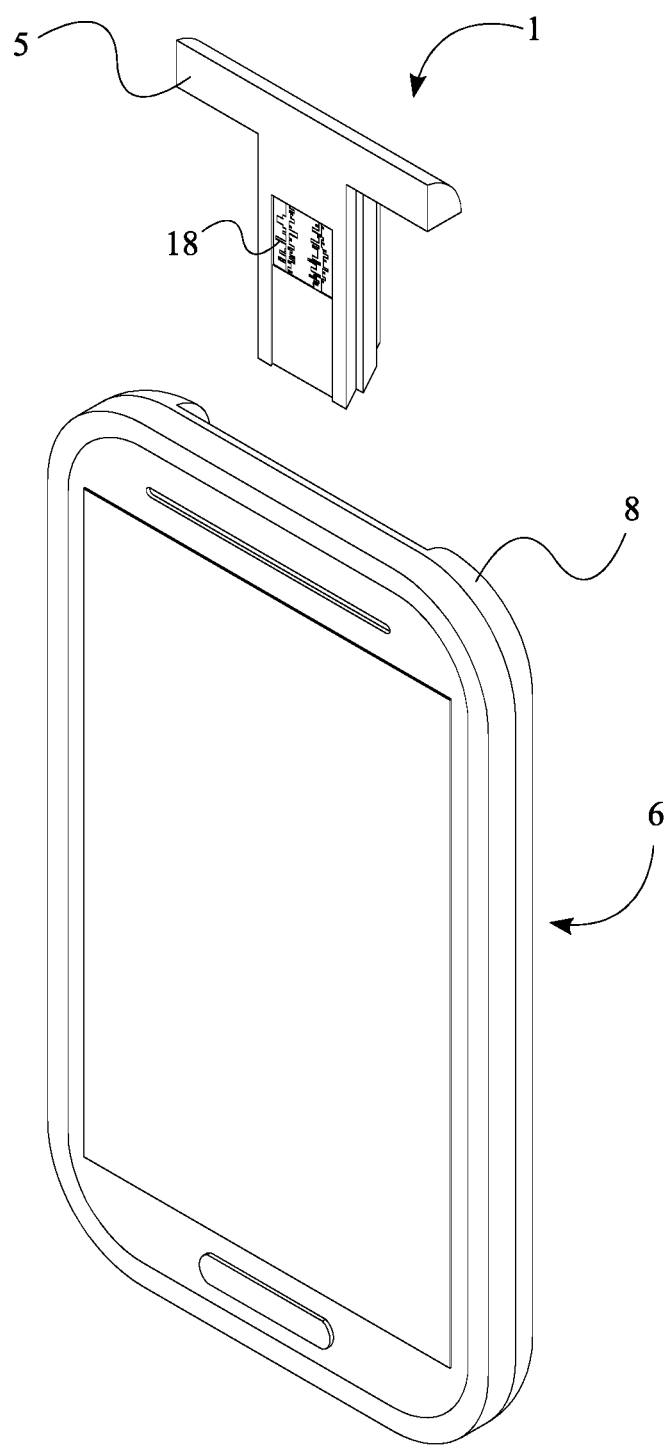
FIG. 4 is an exploded front perspective view of the present invention when used on the electronic device.
Figure 5:
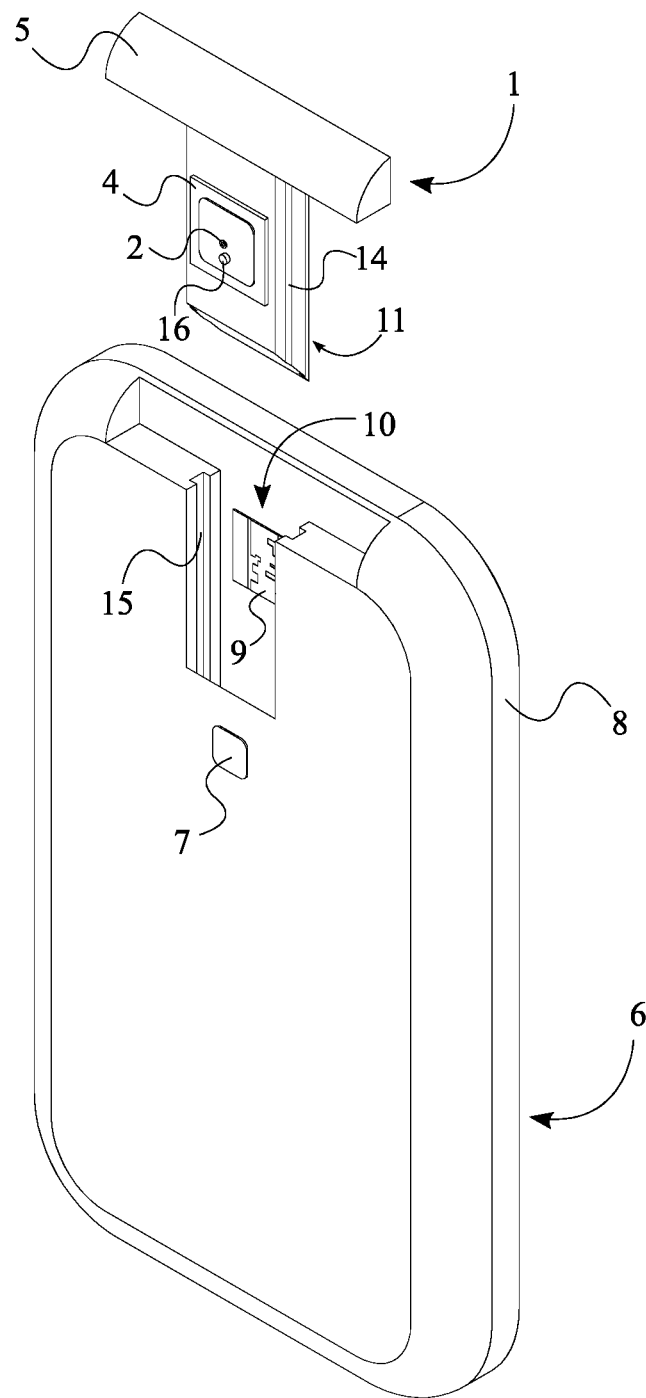
FIG. 5 is an exploded rear perspective view of the present invention when used on the electronic device.
Figure 6:
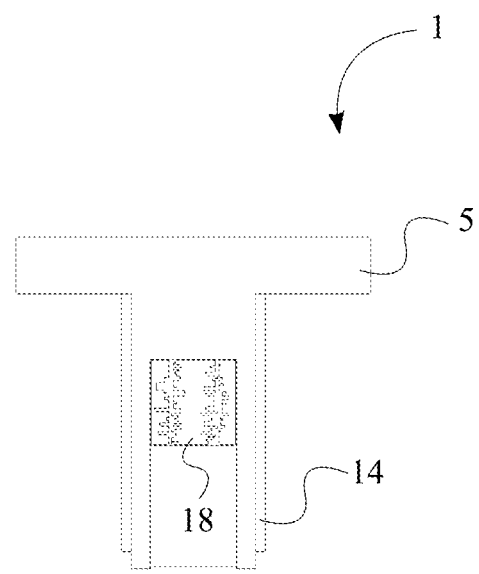
FIG. 6 is a front view of the camera illustrating the contact plate.
Figure 7:
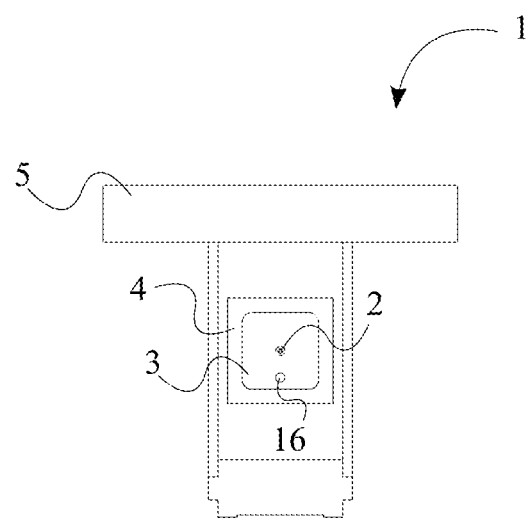
FIG. 7 is a rear view of the camera illustrating the lens.

As shown in FIG. 5 and FIG. 7, for the camera 1 to be removable and fulfill the functionalities of taking a picture or recording video, the camera 1 comprises a lens 2, a wireless transceiver 3, a power source 4, and a structural body 5. The structural body 5 determines the shape and size of the camera 1 and allows the camera 1 to be detached from the electronic device housing 6 when necessary. The power source 4 provides the electrical power required for the camera 1 to function. To do so, the power source 4 is electrically connected to the lens 2 and the wireless transceiver 3. The lens 2 receives visual data that is ultimately used in the image developing process. In one instance, the visual data is related to a still object which is used to develop a still photograph. In another instance, the visual data is related to a moving object and is used to develop a video. To transfer visual data, the lens 2 is electronically connected to the wireless transceiver 3. The wireless transceiver 3 receives user instructions, controls the lens 2 to receive visual data, and transmits the received visual data to the electronic device associated with the present invention. The lens 2 and the wireless transceiver 3 are mounted onto the structural body 5 so that the camera 1 can be conveniently detached from the electronic device housing 6 as shown in FIG. 4 and FIG. 5.

Figure 10:
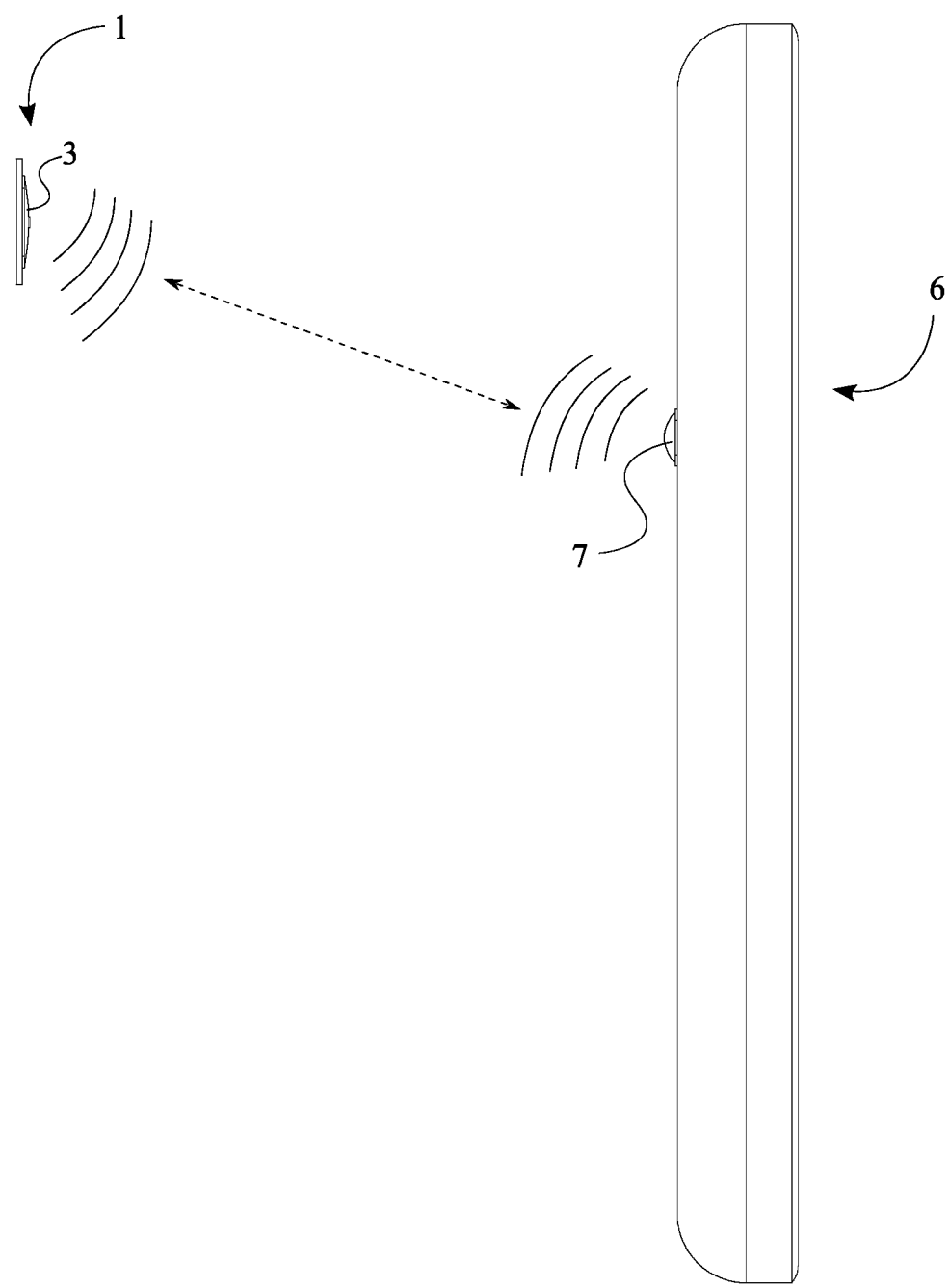
FIG. 10 is an illustration of the camera being communicably coupled with the electronic device housing.

To transmit user instructions to the camera 1 and receive the visual data from the camera 1, the electronic device housing 6 comprises a wireless communication module 7. As illustrated in FIG. 10, to complete the necessary functionalities, the wireless transceiver 3 is communicably coupled with the wireless communication module 7 which is connected to a structural frame 8 of the electronic device housing 6. The electronic device housing 6 is connected to the electronic device used with the present invention via the structural frame 8. To cater to a wide variety of electronic devices, the size and shape of the structural frame 8 varies from one embodiment to another.

When visual data is received by the wireless communication module 7, the visual data needs to be converted into an electronic signal that can produce an image from the received visual data. As shown in FIG. 5, to do so, the electronic device housing 6 further comprises a microprocessor 9 which is mounted onto the structural frame 8. The wireless communication module 7 is electronically connected to the microprocessor 9 so that visual data can be transferred to the electronic device associated with the present invention. The microprocessor 9 ensures that the visual data captured by the camera 1 is accurately displayed on the electronic device. As an example, if a mobile phone is used as the electronic device, the visual data from the camera 1 is transferred onto a display screen of the mobile phone via the microprocessor 9.

The camera 1 further comprises a contact plate 18. The contact plate 18 functions as a terminal between the electronic device used with the present invention and the camera 1. To do so, the contact plate 18 is mounted onto the structural body 5. The positioning of the contact plate 18 allows the electronic device to electronically connect to the camera 1 via the contact plate 18 and the microprocessor 9. Moreover, the contact plate 18 also allows the power source 4 of the camera 1 to be recharged when necessary. As an example, if a mobile phone is used along with the present invention, by connecting the mobile phone to a charger, electrical power can be directed to the power source 4 of the camera 1 via the microprocessor 9 and the contact plate 18.

The camera 1 can be removably attached to the electronic device housing 6 differently in varying embodiments of the present invention. As shown in FIG. 5, the electronic device housing 6 comprises a receiving slot 10 which is used to receive and position the camera 1. In such instances, the receiving slot 10 traverses through the structural frame 8 so that the camera 1 can be removably positioned within the receiving slot 10. The size and shape of the receiving slot 10 can vary according to the size and shape of the camera 1. As an example, if the camera 1 is rectangular in shape, the receiving slot 10 will also be rectangular in shape.

Figure 9:
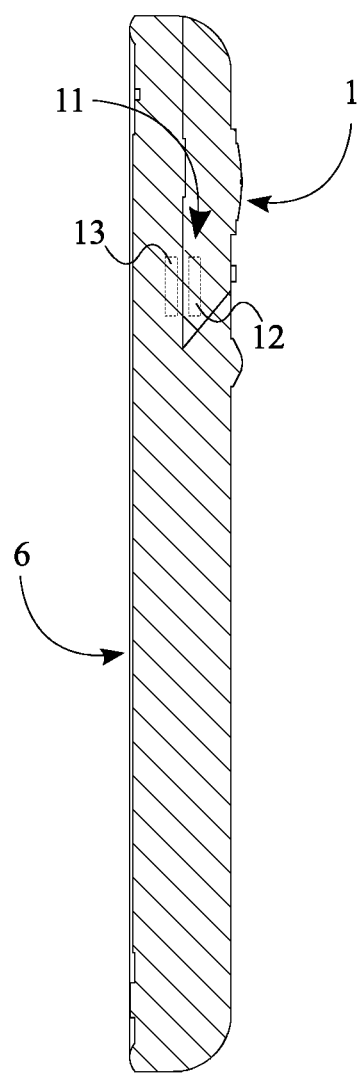
FIG. 9 is a side view of the present invention, wherein the positioning of the camera within the electronic device housing is illustrated.

As mentioned earlier, the camera 1 can be removably attached differently in varying embodiments of the present invention. As seen in FIG. 5 and FIG. 9, the present invention further comprises an attachment mechanism 11 such that the camera 1 can be removably attached to the electronic device housing 6 via the attachment mechanism 11. The attachment mechanism 11 can vary in different embodiments of the present invention.

As shown in FIG. 9, the attachment mechanism 11 comprises a first magnet 12 and a second magnet 13. The first magnet 12 will be mounted onto the structural body 5 of the camera 1. On the other hand, the second magnet 13 will be mounted onto the structural frame 8 of the electronic device housing 6. The first magnet 12 is magnetically coupled to the second magnet 13 so that the camera 1 can be attached to the electronic device housing 6 or detached from the electronic device housing 6 per user preference.

As seen in FIG. 5, in another embodiment, the attachment mechanism 11 comprises a first rail 14 and a second rail 15. The first rail 14 is connected to the structural body 5 and the second rail 15 is connected to the structural frame 8. For the camera 1 to be removably attached to the electronic device housing 6, the first rail 14 is slidably engaged with the second rail 15. Thus, when the camera 1 needs to be attached to the electronic device housing 6 or removed from the electronic device housing 6, the first rail 14 is moved along the second rail 15.

As illustrated in FIG. 7, to enhance user experience, the present invention further comprises a camera flash 16 that is positioned adjacent to the lens 2 and mounted onto the structural body 5. The presence of the camera flash 16 and the positioning of the camera flash 16 is beneficial when utilizing the camera 1 in low light conditions. To provide the necessary electrical power, the camera flash 16 is electrically connected to the power source 4. Moreover, the camera flash 16 is electronically connected to the wireless transceiver 3. Thus, the camera flash 16 can function according to the wirelessly transferred instructions from the user. As an example, if the user intends to turn on the camera flash 16, the wireless transceiver 3 transmits an electric signal which triggers the camera flash 16.

Figure 8A:
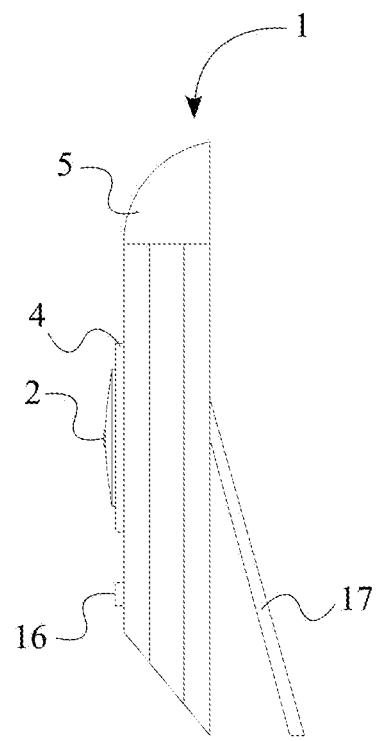
FIG. 8A is a side view of the camera illustrating the kickstand.

Generally, when a camera 1 is positioned at a distance with the intention of taking a picture, a monopod or tripod is used to hold the camera 1. Else, an external stand is used to hold the camera 1 stationary. As shown in FIG. 8A, to eliminate the need to carry a monopod, a tripod, or an external stand, the present invention further comprises a kickstand 17 that is pivotally connected to the structural body 5. When not in use, the kickstand 17 will be pressed against the structural body 5. When required, the kickstand 17 is extended from the structural body 5 so that that camera 1 can be held stationary.

Figure 8B:
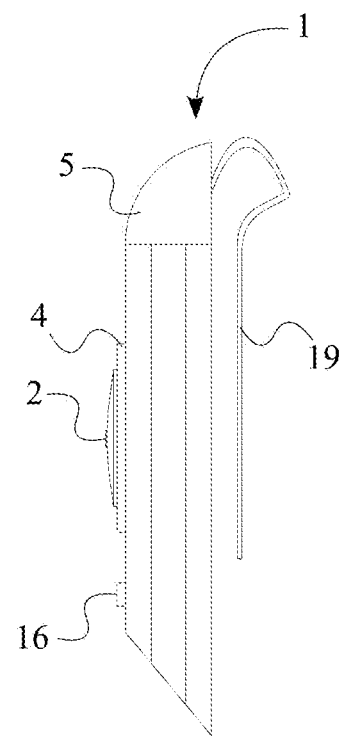
FIG. 8B is a side view of the camera illustrating the attachment pin.

As shown in FIG. 8B, the present invention further comprises an attachment clip 19 that allows the camera 1 to be attached. As an example, the attachment clip 19 can be attached to the body of the user so that a picture or a video can be captured in the point of view of the user. The attachment clip 19 also allows the camera 1 to be used as a body camera. To do so, the attachment clip 19 is externally connected to the structural body 5 opposite to the lens 2.

When the present invention is in use, the following process flow is generally followed. Initially, the electronic device housing 6 is placed to hold an electronic device or used as a device cover for the electronic device. Thus, the electronic device can be used with no hindrance. When the user intends on utilizing the camera 1, to capture a photograph or record a video, the camera 1 is detached from the electronic device housing 6. Next, the camera 1 is positioned at a location according to user preference. When appropriately positioned, the camera 1 is controlled with the electronic device. As an example, if a mobile phone is used as the electronic device, the user instructions are transferred from the electronic device to the wireless communication module 7 through the microprocessor 9. Next, the wireless communication module 7 wirelessly transfers the user instructions to the wireless transceiver 3 so that the lens 2 can gather visual data. The path is reversed to use the captured visual data to develop a photograph or generate a video on the electronic device.

Although the invention has been explained in relation to its preferred embodiment, it is to be understood that many other possible modifications and variations can be made without departing from the spirit and scope of the invention as hereinafter claimed.

What is claimed is:
1. An electronic device housing with a removable camera comprising:
 a camera;
 an electronic device housing;
 an attachment mechanism;

the camera comprising a lens, a wireless transceiver, a power source and a structural body;

the electronic device housing comprising a wireless communication module and a structural frame;

the power source being electrically connected to the lens and the wireless transceiver;

the lens and the wireless transceiver being mounted onto the structural body;

the lens being electronically connected to the wireless transceiver;

the wireless transceiver being communicably coupled with the wireless communication module;

the wireless communication module being connected to the structural frame;

the camera being removably attached to the electronic device housing via the attachment mechanism;

the attachment mechanism comprising two first rails and two second rails;

the two first rails being connected along two external sides of the structural body respectively;

the two external sides being oppositely positioned to each other;

the two second rails being connected along two internal sides of the structural frame respectively;

the two internal sides being oppositely positioned to each other; and the two first rails being slidably engaged with the two second rails respectively.

2. The electronic device housing with a removable camera as claimed in claim 1 comprising:

the electronic device housing further comprising a microprocessor;

the microprocessor being mounted onto the structural frame; and the wireless communication module being electronically connected to the microprocessor.

3. The electronic device housing with a removable camera as claimed in claim 1 comprising:

the electronic device housing comprising a receiving slot;

the receiving slot traversing through the structural frame; and the camera being removably positioned within the receiving slot.

4. The electronic device housing with a removable camera as claimed in claim 1 comprising:

the attachment mechanism comprising a first magnet and a second magnet;

the first magnet being mounted onto the structural body;

the second magnet being mounted onto the structural frame; and the first magnet being magnetically coupled with the second magnet.

5. The electronic device housing with a removable camera as claimed in claim 1 comprising:

a camera flash;

the camera flash being positioned adjacent to the lens;

the camera flash being mounted onto the structural body;

the camera flash being electrically connected to the power source; and the camera flash being electronically connected to the wireless transceiver.

6. The electronic device housing with a removable camera as claimed in claim 1 comprising:

a kickstand; and the kickstand being pivotally connected to the structural body.

7. The electronic device housing with a removable camera as claimed in claim 1 comprising:

a camera comprising a contact plate; and the contact plate being mounted onto the structural body.

8. The electronic device housing with a removable camera as claimed in claim 1 comprising:

an attachment clip; and the attachment clip being externally connected to the structural body opposite to the lens.

9. The electronic device housing with a removable camera as claimed in claim 1, wherein the electronic device housing is a device cover.

* * * * *